United States Patent Office 3,371,106
Patented Feb. 27, 1968

3,371,106
ACETYL SUBSTITUTED PHENOXYACETAMIDES AND THEIR USE AS HERBICIDES
Jordan P. Berliner and Sidney B. Richter, Chicago, Ill., assignors to Velsicol Chemical Corporation, Chicago, Ill., a corporation of Illinois
No Drawing. Filed Aug. 11, 1964, Ser. No. 388,915
9 Claims. (Cl. 260—453)

ABSTRACT OF THE DISCLOSURE

A compound of the formula

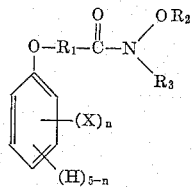

wherein $n$ is an integer from 1 to 4; each X is independently selected from the group consisting of chlorine, bromine and unsubstituted lower alkyl; $R_1$ is an unsubstituted alkylene containing from 1 to 4 carbon atoms; $R_2$ is selected from the group consisting of lower alkanoyl acyl, unsubstituted lower alkyl, phenyl, and lower alkene; $R_3$ is selected from the group consisting of lower alkanoyl acyl, unsubstituted lower alkyl, phenyl and lower alkene; wherein at least one of $R_2$ and $R_3$ is lower alkanoyl acyl. A method for the pre-emergence control of undesirable plant life which comprises applying to soil containing seeds of the undesirable plant life a herbicidal composition comprising an inert carrier and as the essential active ingredient, in a quantiay which is herbicidally injurious to said undesirable plant life, the foregoing compound.

---

This invention relates to new chemical compositions of matter. More specifically, this invention relates to new chemical compounds of the formula

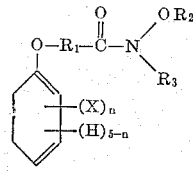

wherein $n$ is an integer from 1 to 4; each X is independently selected from the group consisting of halogen and unsubstituted lower alkyl; $R_1$ is an unsubstituted alkylene; $R_2$ is selected from the group consisting of lower acyl, unsubstituted lower alkyl, aryl, and lower alkene; $R_3$ is selected from the group consisting of lower acyl, unsubstituted lower alkyl, aryl, and lower alkene; wherein at least one of $R_2$ and $R_3$ is lower acyl. In a preferred embodiment of this invention, $n$ is an integer from 1 to 4; each X is independently selected from the group consisting of halogen and unsubstituted lower alkyl containing from 1 to 3 carbon atoms, $R_1$ is an unsubstituted alkylene containing from 1 to 4 carbon atoms; $R_2$ is selected from the group consisting of lower acyl, unsubstituted lower alkyl containing from 1 to 4 carbon atoms, aryl, and lower alkene containing from 2 to 4 carbon atoms; $R_3$ is selected from the group consisting of lower acyl, unsubstituted lower alkyl containing 1 to 4 carbon atoms, aryl and lower alkene containing from 2 to 4 carbon atoms; wherein at least one of $R_2$ and $R_3$ is lower acyl. In a further preferred embodiment of this invention, $R_2$ is selected from the group consisting of lower acyl containing from 1 to 3 carbon atoms and unsubstituted lower alkyl containing from 1 to 4 carbon atoms, $R_3$ is selected from the group consisting of lower acyl containing 1 to 3 carbon atoms, and unsubstituted lower alkyl containing from 1 to 4 carbon atoms and at least one of $R_2$ and $R_3$ is lower acyl; X and $R_1$ are as described above and the X's are positioned on the ring at the 2, the 4, the 2,4, or the 2,4,5-positions. A most preferred embodiment of the present invention is when $R_1$ is methylene, $R_2$ is selected from the group consisting of acetyl and unsubstituted lower alkyl containing 1 to 3 carbon atoms, $R_3$ is selected from the group consisting of acetyl and unsubstituted lower alkyl containing from 1 to 3 carbon atoms, and wherein at least one of $R_2$ and $R_3$ is acetyl, and the X's positioned on the ring at the 2,4-position are independently selected from the group consisting of chlorine and unsubstituted lower alkyl groups. These new compounds are useful as pesticides, particularly as herbicides.

The novel amides of the present invention can be prepared conveniently employing the corresponding acid as the starting material. This acid is often commercially available, or can be synthesized by treating the corresponding phenol with an alkali metal hydroxide to form a salt, and treating this salt with an acid of the formula $$\text{Hal}—R_1—\text{COOH}$$

wherein Hal is any of the group of halogens such as chlorine, bromine and the like, and $R_1$ is as described above. For example, when it is desired to prepare the 2-alkyl-4-chloro-ring substituted amides the starting materials, i.e. 2-alkyl-4-chlorophenoxyacetic acids, can be synthesized by treating the corresponding 2-alkyl-4-chlorophenol with an alkali metal hydroxide to form the salt, and treating the salt with an acid of the formula $$\text{Hal}—R_1—\text{COOH}$$

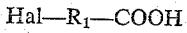

wherein Hal and $R_1$ are as described above to yield the desired free acid.

Examples of suitable free acids from which the compounds of the present invention can be prepared are:

2-methyl-4-chlorophenoxy acetic acid,
2,4-dichlorophenoxy acetic acid,
2,4,5-trichlorophenoxy acetic acid,
2,4-dimethylphenoxy acetic acid,
2,3,5,6-tetrachlorophenoxy acetic acid,
α-(2-methyl-4-chlorophenoxy) propionic acid,
β-(2-methyl-4-chlorophenoxy) propionic acid,
α-(2-methyl-4-chlorophenoxy) n-butyric acid,
β-(2-methyl-4-chlorophenoxy) n-butyric acid,
γ-(2-methyl-4-chlorophenoxy) isobutyric acid,
α-(2,4,5-trichlorophenoxy) propionic acid,
β-(2,4,5-trichlorophenoxy) propionic acid,
α-(2,4-dimethylphenoxy) propionic acid,
β-(2,4-dimethylphenoxy) propionic acid,
α-(2,4-dichlorophenoxy) propionic acid,
β-(2,4-dichlorophenoxy) propionic acid, and the like.

The free acid can be converted to its acid chloride or ester, which is then treated with a suitable amine of the formula HN(Z)OY wherein Z is H or lower alkyl and Y is lower acyl, unsubstituted lower alkyl, aryl, or lower alkene to give the desired intermediates of the present invention. Amines suitable for use in the method of the present invention can be prepared by methods described in Jones and Major, J. Am. Chem. Soc., vol. 52, pp. 669–79 (1930) and Major and Fleck, J. Am. Chem. Soc., vol. 50, pp. 1479–81 (1928). Exemplary of suitable amines useful as reactants in the present invention are: methoxyamine, N-methylhydroxylamine, ethoxyamine, n-propoxyamine, iso-propoxyamine, n-butoxyamine, and the like. For purposes of the present invention, it is preferable to use the hydrochlorides of the amines in the presence of a base such as potassium carbonate, sodium hydroxide, and potassium hydroxide.

More particularly, the free acid, dissolved in about 10 parts by weight of a solvent such as acetone per part of the free acid, can be treated with an equimolar or greater quantity of dimethyl sulfate in the presence of a base such as potassium carbonate, which is present in an amount about equimolar with the dimethyl sulfate concentration. The treatment is performed with heating for several hours, preferably at reflux. The corresponding ester thus formed can be isolated from the reaction mixture by means common to the art, such as by filtration, distillation, and the like.

In the next step, the ester can be reacted with a suitable amine such as N-methylhydroxylamine or the amine hydrochloride. This reaction is accomplished by dissolving the amine or amine hydrochloride in about 5 parts by weight of a solvent such as methanol in the presence of a base such as potassium hydroxide. The basic solution and the ester are combined with cooling to keep the exothermic reaction at about room temperature. The product is recovered from this reaction by common physical means. This product can then be treated with about an equimolar amount of a suitable acyl halide in the presence of a solvent such as dioxan which is present in a concentration of about 8 parts by weight to 1 part of the above product. The reaction mixture is heated for several hours preferably at about reflux temperature and then added to water. After this dilution, the final product can be recovered by methods common to the art such as filtration, evaporation and the like.

Suitable acyl halides which can be employed in the methods of the present invention are acetyl chloride, acetyl bromide, propionyl chloride, propionyl bromide, butyryl chloride, butyryl bromide, and the like lower alkanoyl halides.

An alternative method for the production of the new compounds of the present invention is to treat the free acid with thionyl chloride rather than dimethyl sulfate. More particularly, the free acid can be treated with an equimolar or greater quantity of thionyl chloride, preferably in a solvent or diluent, such as toluene, benzene, heptane and the like. An amount of solvent or diluent approximately equal in volume to the volume of the free acid has been found to be satisfactory. The treatment is performed by heating for several hours, preferably at reflux if a solvent or diluent such as toluene or a large excess of thionyl chloride is used. The corresponding acyl chloride thus formed can be isolated from the reaction mixture by means common to the art, such as by distillation of the solvent or diluent and unreacted reactants, leaving the crude acyl chloride as the residue.

Next, the acyl chloride can be reacted with an equimolar or greater amount of the appropriate alkyl or aryl hydroxylamine or its hydrochloride, in the presence of a base, such as sodium hydroxide, potassium hydroxide, potassium carbonate, and the like, to yield a substituted amide. At least one equivalent quantity of base is used when the free amine is utilized as the reactant, and at least twice that amount is used when the amine hydrochloride is used as the reactant. The base is used to release the amine from its hydrochloride, and to neutralize the hydrogen chloride formed during the reaction. It is preferable to add a small amount of water to the reaction mixture to form an aqueous solution of the base to aid in mixing the base into the solution of the amine or amine hydrochloride. The reaction is conveniently performed utilizing a solvent or diluent, such as benzene. Suitable temperatures for this reaction range from about 0° C. to the boiling point of the solvent or diluent, with a preferred temperature range of from about 20° C. to the boiling point of the solvent. When potassium carbonate is used as the base, completion of the reaction can be readily detected by the cessation of the release of carbon dioxide gas.

The substituted amide produced can be separated from the reaction mixture by means common to the art such as filtration. A solution of this product can then be treated in several alternative manners to arrive at the desired final product. In one method, the substituted amide is treated with an approximately equimolar amount of a base such as potassium hydroxide dissolved in an alcohol solvent such as methanol, ethanol and the like. An amount of alcohol is used sufficient to dissolve the base. The substituted amide can be dissolved in alcohol or in dioxan. The reaction can be effected by heating the reaction mixture for several hours, preferably at reflux temperature. The salt thus produced can be separated readily by means common to the art and then this salt can be treated with about an equimolar amount of a suitable acyl halide in the presence of a solvent such as dioxan which is present in a concentration of about 8 parts by weight to 1 part of the salt. The reaction mixture is heated for several hours preferably at about reflux temperature and then added to water. After this dilution, the final product is recovered by means common to the art such as filtration, evaporation and the like. In another method, the substituted amide can be treated with a large excess of acid anhydride in the presence of a catalytic amount of a base such as pyridine. In a preferred embodiment, a molar ratio of about 20 parts of anhydride can be employed per part of amide. The reaction can be effected by heating the reaction mixture for several hours, preferably at reflux temperature. After heating, the mixture is diluted with water and treated with a base such as sodium hydroxide. The final product can then be recovered by methods common to the art such as solvent extraction and the like.

The manner in which the new compounds of this invention can be prepared is illustrated in the following examples.

*Example 1.—Preparation of 4-chloro-2-methylphenoxyacetyl chloride*

Thionyl chloride (407 ml.; 5.60 moles) was added to a mixture of 4-chloro-2-methylphenoxyacetic acid (1021 g.; 5.09 moles) in toluene (1 l.) in a 5 l. three-necked flask fitted with a stirrer and condenser with a calcium chloride tube. The reaction mixture was stirred and heated at reflux temperature for about 6 hours. The mixture was then treated with Nuchar CN and filtered hot through Super Cel.

The filtrate was dried over magnesium sulfate, filtered and distilled under reduced pressure to remove the solvent and excess thionyl chloride. The dark brown liquid residue was vacuum distilled to yield the product, 4-chloro-2-methylphenoxyacetyl chloride, as a clear golden brown liquid boiling at 114°–124° C. at 0.55–0.7 mm. Hg pressure.

*Example 2.—Preparation of N-methoxy-4-chloro-2-methylphenoxyacetamide*

In a 500 ml. three-necked flask fitted with a stirrer, condenser, and addition funnel, potassium carbonate (24.7 g.; 0.179 mole) and a solution of methoxy-amine-hydrochloride (13.6 g.; 0.163 mole) in benzene (180 ml.) were placed. The mixture was cooled in an ice bath, and water, (18 ml.) was slowly added followed by the gradual addition of 4-chloro-2-methylphenoxyacetyl chloride (35.7 g.; 0.163 mole). After completion of the addition, the reaction mixture was stirred and heated at reflux temperature for about 7 hours. The mixture was then filtered and the filter cake was washed three times with benzene. The washings and the filtrate were combined and the aqueous layer was removed. The remaining organic layer was dried over magnesium sulfate, filtered, and distilled under aspirator pressure to remove the solvent. The product, N-methoxy-4-chloro-2-methylphenoxyacetamide, a white solid, was recrystallized from benzene-hexane, washed with hexane and air-dried, M.P. 86°–93° C.

Example 3.—Preparation of the potassium salt of N-methoxy-4-chloro-2-methylphenoxyacetamide A solution of N-methoxy-4-chloro-2-methylphenoxyacetamide (15.2 g.; 0.066 mole) in dioxan (50 ml.) and 90% potassium hydroxide (4.1 g.; 0.066 mole) in absolute ethanol (30 ml.) was placed in a 250 ml. three-necked flask fitted with a stirrer and condenser with a calcium chloride tube. The reaction mixture was stirred and heated at reflux temperature for 6½ hours. The mixture was then evaporated in a rotary evaporator to yield a yellow-brown amorphous solid. This solid was taken up in ether. The ether solution was dried over magnesium sulfate, filtered and evaporated on a steam bath to yield a solid which was air-dried, and again treated with ether. The solid did not dissolve and the suspension was filtered. The white solid obtained was the potassium salt of N-methoxy-4-chloro-2-methylphenoxyacetamide.

Example 4.—Preparation of N-acetyl-N-methoxy-4-chloro-2-methylphenoxyacetamide The potassium salt of N-methoxy-4-chloro-2-methylphenoxyacetamide (6.2 g.; 0.023 mole) in dioxan (50 ml.) was placed in a 100 ml. three-necked flask fitted with a stirrer, condenser, and addition funnel. Acetyl chloride (1.8 g.; 0.023 mole) was added to the stirred mixture in the flask. The reaction mixture was stirred and heated at reflux temperature for 2½ hours. The mixture was then cooled to room temperature and poured into distilled water (500 ml.). An oil layer formed which soon solidified. The solid was filtered out and washed with water. The solid was dissolved in ether and the aqueous layer was removed. The ether layer was dried over magnesium sulfate, filtered, and evaporated on a steam bath. The residue was a yellow liquid which solidified to a white solid. The product, N-acetyl-N-methoxy - 4 - chloro-2-methylphenoxyacetamide, was recrystallized from absolute ethanol, washed in a little ethanol, and air dried, M.P. 94°–104° C.

Analysis for $C_{12}H_{14}ClNO_4$: Theory, percent C, 53.04; H, 5.16; N, 5.16. Found, percent C, 53.10; H, 5.34; N, 5.18.

Example 5.—Preparation of N-hydroxy-N-phenyl-4-chloro-2-methylphenoxyacetamide In a 500 ml. three-necked flask fitted with a stirrer, thermometer, condenser, and addition funnel, 20% aqueous sodium hydroxide (31 ml., 0.151 mole) and a solution of N-phenylhydroxylamine (15 g.; 0.137 mole) in 1,2-dichloroethane (150 ml.) were placed. The mixture was cooled in an ice bath to under 10° C. and 4-chloro-2-methylphenoxyacetyl chloride (30 g.; 0.137 mole) was then slowly added keeping the temperature in the flask below 10° C. During this addition, a yellow solid came out of solution. After all the acid chloride had been added, the ice bath was removed and the reaction mixture was stirred for about 1½ hours as it warmed up to room temperature. During this time, the reaction mixture began to darken and it was filtered. The filter cake was washed once with 1,2-dichloroethane and air-dried. A white solid was recovered and this solid was triturated with pentane and air dried. The product, N-hydroxy-N-phenyl-4-chloro-2-methylphenoxyacetamide, was then recrystallized from methanol and again washed with pentane and air-dried, M.P. 163°–164° C.

Example 6.—Preparation of N-acetoxy-N-phenyl-4-chloro-2-methylphenoxyacetamide In a 100 ml. three-necked flask fitted with a stirrer and condenser, a solution of N - hydroxy-N-phenyl-4-chloro-2-methylphenoxyacetamide (2.6 g.; 0.009 mole) in acetic anhydride (16 ml., 0.17 mole) was placed. Pyridine (1 ml.) was added and the reaction mixture was heated and stirred with refluxing for 6½ hours. After completion of the heating, the reaction mixture was treated with hot water to destroy the remaining unreacted acetic anhydride. The mixture was then cooled and 20% sodium hydroxide (100 ml.) was added. The mixture was extracted three times with benzene and the benzene extracts were washed with water. The benzene solution was then dried over magnesium sulfate, filtered, and distilled under reduced pressure to yield a red-brown liquid residue. This liquid was vacuum distilled and the distillate was the product, N-acetoxy-N-phenyl-4-chloro-2-methylphenoxy-acetamide, a brown liquid, B.P. 186°–196° C./ 0.18–0.20 mm. Hg.

Analysis for $C_{17}H_{16}ClNO_4$: Theory, percent Cl, 10.64; N, 4.20. Found, percent Cl, 10.81; N, 4.39.

Example 7.—Preparation of methyl (4-chloro-2-methylphenoxy) acetate

A solution of 4-chloro-2-methylphenoxyacetic acid (293.5 g.; 1.464 moles) in acetone (3 l.) is placed in a 5 l., 3-necked round-bottom flask fitted with a mechanical stirrer reflux condenser and a dropping funnel. Potassium carbonate (222.2 g.; 1.61 moles) is added to this solution and the mixture is stirred. Upon the addition of the potassium carbonate, a solid mass forms which breaks up when it is cut apart with a spatula and heated. Dimethyl sulfate (153 ml.; 1.61 moles) is then added slowly with stirring and heating at reflux. The stirring and heating at reflux are continued for six hours. The reaction mixture is filtered and the filter cake is washed three times with acetone. The washings and filtrate are combined and distilled under aspirator pressure to remove the solvent and a brown liquid is obtained. This liquid is taken up in ether and extracted three times with 10% sodium carbonate. The ether solution is dried over magnesium sulfate, filtered, and evaporated on a steam bath, leaving a dark brown liquid. This liquid is vacuum distilled to yield methyl (4-chloro-2-methylphenoxy) acetate, as a clear colorless liquid.

Example 8.—Preparation of potassium (4-chloro-2-methylphenoxy)-N-methylacetohydroxamate Separate solutions of N-methylhydroxylamine hydrochloride (81.2 g.; 0.976 mole) dissolved in absolute methanol (347 ml.) and potassium hydroxide (96.6 g.; 1.464 moles) also dissolved in absolute methanol (241 ml.) are prepared at the boiling point of the solvent (64.7° C.). Both solutions are cooled to room temperature and the alkali solution is added to the hydroxylamine solution with stirring and periodic cooling in an ice bath. After all the alkali has been added, the mixture is allowed to stand in an ice bath for 5 minutes after which the potassium chloride precipitate is filtered out. The filter cake is washed with methanol and the washings are combined with the filtrate. Methyl (4-chloro-2-methylphenoxy) acetate (104.7 g.; 0.488 mole) is then added with stirring to this solution. The reaction mixture is placed in an Erlenmeyer flask and allowed to stand at room temperature overnight. The solution is then refrigerated for 72 hours and a solid crystallizes. This solid is filtered, washed and air dried. The mother liquor is concentrated using a rotary evaporator, seeded with a few crystals and placed in an ice bath. A solid crystallizes out of the solution and is filtered, washed, air dried and combined with the crystals obtained above. The combined solids are potassium (4 - chloro - 2 - methylphenoxy)-N-methylacetohydroxamate.

Example 9.—Preparation of N-methyl-N-acetoxy-4-chloro-2-methylphenoxyacetamide A suspension of finely powdered potassium (4-chloro-2-methylphenoxy)-N-methylacetohydroxamate (20.8 g.; 0.078 mole) in dioxan (100 ml.) is placed in a 300 ml. three-necked flask fitted with a stirrer, condenser, and addition funnel. To this mixture acetyl chloride (6.1 g.; 0.078 mole) is added with stirring. The addition is mildly exothermic. The reaction mixture is stirred and heated at reflux for 30 minutes after which the mixture is stirred as it cools to room temperature. This reaction mixture is slowly added to distilled water (1 l.). The solid is filtered and washed with water and then dissolved in benzene. Upon treatment of the benzene solution with pentane, a solid forms which is filtered, washed with pentane, and air dried. The solid is then dissolved in ether and the ether solution is dried over magnesium sulfate, filtered, and evaporated on a steam bath to yield a solid. The product is recrystallized, washed and air dried to yield N-methyl-N-acetoxy-4-chloro-2-methylphenoxyacetamide.

Other compounds within the scope of the present invention can be prepared by methods detailed in the preceding examples. In the following examples, the free acid starting material, the amine and the acyl halide reactants which can be used to prepare the indicated named compounds of this invention are set forth.

*Example 10*

2,4 - dichlorophenoxyacetic acid+N-methylhydroxylamine+acetyl chloride=N - methyl - N - acetoxy-2,4-dichlorophenoxyacetamide.

*Example 11*

2,4-dichlorophenoxyacetic acid+methoxyamine+acetyl chloride=N - acetyl - N - methoxy-2,4-dichlorophenoxyacetamide.

*Example 12*

2,4-dibromophenoxyacetic acid+methoxyamine+acetyl chloride=N - acetyl-N-methoxy-2,4-dibromophenoxyacetamide.

*Example 13*

2,4,5 - trichlorophenoxyacetic acid+methoxyamine +acetyl chloride=N - acetyl-N-methoxy-2,4,5-trichlorophenoxyacetamide.

*Example 14*

2,4,5-trichlorophenoxyacetic acid+N-methylhydroxylamine+acetyl chloride=N - methyl-N-acetoxy-2,4,5-trichlorophenoxyacetamide.

*Example 15*

4-chloro-2-methylphenoxyacetic acid+n-propoxyamine +acetyl chloride=N - acetyl - N - n-propoxy-4-chloro-2-methylphenoxyacetamide.

*Example 16*

4-chloro - 2 - methylphenoxyacetic acid+n-butoxyamine +acetyl chloride=N-acetyl - N - n - butoxy-4-chloro-2-methylphenoxyacetamide.

*Example 17*

4 - chloro-2-methylphenoxyacetic acid+methoxyamine +benzoyl chloride=N - benzoyl-N-methoxy-4-chloro-2-methylphenoxyacetamide.

*Example 18*

4-chloro - 2 - methylphenoxyacetic acid+N-methylhydroxylamine+benzoyl chloride=N-methyl-N-benzoxy-4-chloro-2-methylphenoxyacetamide.

*Example 19*

4-chloro - 2 - methylphenoxypropionic acid+N-methylhydroxylamine+acetyl chloride=N-methyl-N-acetoxy-4-chloro-2-methylpropionamide.

*Example 20*

4-chloro - α,2 - dimethylphenoxyacetic acid+N-methylhydroxylamine+acetyl chloride=N-methyl-N-acetoxy-4-chloro-α,2-dimethylphenoxyacetamide.

*Example 21*

4 - chloro-2-methylphenoxyacetic acid+methoxyamine +propionyl chloride=N-propionyl-N-methoxy-4-chloro-2-methylphenoxyacetamide.

For practical use as herbicides, the compounds of this invention are generally incorporated into herbicidal compositions which comprise an inert carrier and a hericidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in there solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

*Example 22.—Preparation of a dust*

| | Parts by weight |
|---|---|
| Product of Example 7 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The herbicides of this inevntion can be applied in any manner recognized by the art. The concentration of the new compounds of this invention in the herbicidal compositions will vary greatly with the types of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interferring with the production of cultivated crops or with the welfare of livestock. Many types of weeds are known, including annuals such as pigweed, lambsquarters, yellow foxtail, crabgrass, wild mustard, Frenchweed, rye-grass, goosegrass, chickweed, and smartweed; biennials such as wild carrot, great burdock, mullein, round-leaved mallow, blue thistle, bull thistle, houndstongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. These exact amounts of compound required will depend on a variety of factors, including the hardiness of the particular weed species, weather, method of application, the kind of beneficial plants in the same area, and the like. Thus while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution.

The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

The pre-emergence herbicidal activity of the compounds of the present invention was illustrated, for example, by a number of experiments carried out for the control of various weeds. In one series of tests, the test compounds formulated as aqueous emulsions were sprayed at various dosages on the surface of soil wihch had been seeded less than twenty-four hours earlier with seeds of crop plants and weeds. After spraying, the soil containers were placed in the greenhouse and provided with supplementary light and heat as required and daily or more frequent watering. The severity of injury to each weed was determined about 20 days after the soil treatments. The severity of injury was rated on a 0 to 10 scale as follows: 0=no injury; 1,2=slight injury; 3,4=moderate injury; 5,6=moderately severe injury; 7,8,9=severe injury; 10=death. Some of the results of these tests are presented in the following tables:

TABLE I.—INJURY RATINGS

| Test Plant | Concentration of N-acetyl-N-methoxy-4-chloro-2-methylphenoxyacetamide | | |
|---|---|---|---|
| | 1 lb. per acre | 2 lbs. per acre | 8 lbs. per acre |
| Crabgrass | 9 | 9 | 10 |
| Foxtail | 9 | 8 | 10 |
| Mustard | 9 | 10 | 10 |
| Pigweed | 10 | 10 | 10 |
| Velvet Leaf | 9 | 10 | 10 |
| Downy Brome | 6 | 9 | 9 |

Another series of tests which were run, shows the post-emergence herbicidal activity of the compounds of this invention. The test compounds were formulated as aqueous emulsions and sprayed at various dosages on the foliage of weeds that had attained a prescribed size. After being sprayed the plants were placed in a greenhouse and watered either daily or more frequently. Water was not applied to the foliage of treated plants. The severity of injury to each weed was determined 13 days after the plants were treated. The degree of injury was rated on the same basis as in the aforementioned series of tests. Some of the results of these tests are presented in the following table:

TABLE II.—INJURY RATINGS

| Test Plant | Concentration of N-acetyl-N-methoxy-4-chloro-2-methylphenoxyacetamide | | |
|---|---|---|---|
| | 1 lb. per acre | 2 lbs. per acre | 8 lbs. per acre |
| Barnyard Grass | 3 | 8 | 9 |
| Dock | 8 | 7 | 10 |
| Mustard | 9 | 10 | 10 |
| Pigweed | 9 | 10 | 10 |

We claim:
1. A compound of the formula:

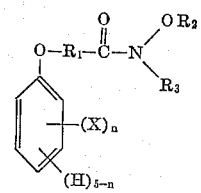

wherein $n$ is an integer from 1 to 4; each X is independently selected from the group consisting of chlorine, bromine and unsubstituted lower alkyl; $R_1$ is an unsubstituted alkylene containing from 1 to 4 carbon atoms; $R_2$ is selected from the group consisting of lower alkanoyl acyl, unsubstituted lower alkyl, phenyl, and lower alkene; $R_3$ is selected from the group consisting of lower alkanoyl acyl, unsubstituted lower alkyl, phenyl and lower alkene; wherein at least one of $R_2$ and $R_3$ is lower alkanoyl acyl.

2. A compound of the formula:

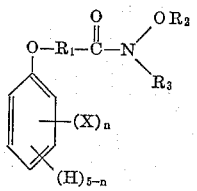

wherein $n$ is an integer from 1 to 4; each X is independently selected from the group consisting of chlorine, bromine and unsubstituted lower alkyl containing from 1 to 3 carbon atoms, $R_1$ is an unsubstituted alkylene containing from 1 to 4 carbon atoms; $R_2$ is selected from the group consisting of lower alkanoyl acyl, unsubstituted lower alkyl containing from 1 to 4 carbon atoms, phenyl, and lower alkene containing 2 to 4 carbon atoms; $R_3$ is selected from the group consisting of lower alkanoyl acyl, unsubstituted lower alkyl containing from 1 to 4 carbon atoms, phenyl, and lower alkene containing from 2 to 4 carbon atoms; wherein at least one of $R_2$ and $R_3$ is lower alkanoyl acyl.

3. A compound of the formula:

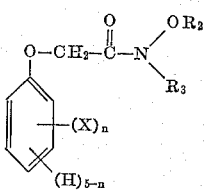

wherein $n$ is an integer from 1 to 4; each X is independently selected from he group consisting of chlorine, bromine and unsubstituted lower alkyl containing from 1 to 3 carbon atoms, $R_2$ is selected from the group consisting of lower alkanoyl acyl containing from 1 to 3 carbon atoms, unsubstituted lower alkyl containing from 1 to 4 carbon atoms, phenyl, and lower alkene containing 2 to 4 carbon atoms; $R_3$ is selected from the group consisting of lower alkanoyl acyl containing from 1 to 3 carbon atoms, unsubstituted lower alkyl containing from 1 to 4 carbon atoms, phenyl, and lower alkene containing from 2 to 4 carbon atoms; wherein at least one of $R_2$ and $R_3$ is lower alkanoyl acyl.

4. N-acetyl-N-methoxy - 4 - chloro - 2 - methylphenoxyacetamide.
5. N-acetoxy-N-phenyl - 4 - chloro - 2 - methylphenoxyacetamide.
6. N-methyl-N-acetoxy - 4 - chloro - 2 - methylphenoxyacetamide.
7. N-methyl-N-acetoxy-2,4-dichlorophenoxyacetamide.
8. N-acetyl-N-methoxy-2,4-dichlorophenoxyacetamide.
9. N-acetyl-N-methoxy - 2,4,5 - trichlorophenoxyacetamide.

References Cited
UNITED STATES PATENTS

| | | | |
|---|---|---|---|
| 3,027,407 | 3/1962 | Major et al. | 260—453 |
| 3,166,589 | 1/1965 | Richter | 260—453 |
| 3,166,591 | 1/1965 | Richter | 260—453 |
| 3,168,561 | 2/1965 | Richter | 260—453 |
| 3,236,871 | 2/1966 | Hinman et al. | 260—453 |

JOSEPH P. BRUST, *Primary Examiner.*